United States Patent

[11] 3,610,643

| [72] | Inventor | Albion J. Thompson |
| | | Millinocket, Maine |
| [21] | Appl. No. | 838,966 |
| [22] | Filed | July 3, 1969 |
| [45] | Patented | Oct. 5, 1971 |
| [73] | Assignee | Great Northern Paper Company |

[54] CHUCK ADAPTER
5 Claims, No Drawings

[52] U.S. Cl................................................. 279/1 A,
82/44, 242/72.1, 279/2
[51] Int. Cl....................................................... B23b 31/40
[50] Field of Search........................................... 279/2, 1 A,
1 F, 1 ME; 242/72, 72.1; 82/44

[56] References Cited
UNITED STATES PATENTS
2,704,481  3/1955  Reynolds..................... 279/2 X
2,922,592  1/1960  Kaltenbach.................. 279/2 X
2,983,460  5/1961  Wright......................... 242/72.1 X FOREIGN PATENTS
1,052,446  1/1953  France......................... 279/2

Primary Examiner—Andrew R. Juhasz
Assistant Examiner—James F. Coan
Attorney—Pennie, Edmonds, Morton, Taylor and Adams ABSTRACT: A chuck adapter for locking a chuck internally into a hollow tube. The chuck adapter comprises generally a cylindrical shell having a plurality of longitudinal openings which are aligned with a plurality of gripping bars carrying protruding blades which project through said openings and an axially movable cone member engaging cam surfaces on the gripping blades. The gripping bars are adapted to pivot about a fulcrum positioned in the interior of said shell to grip the tube as the cone member is moved axially with respect to the shell upon engagement with the end of a chuck.

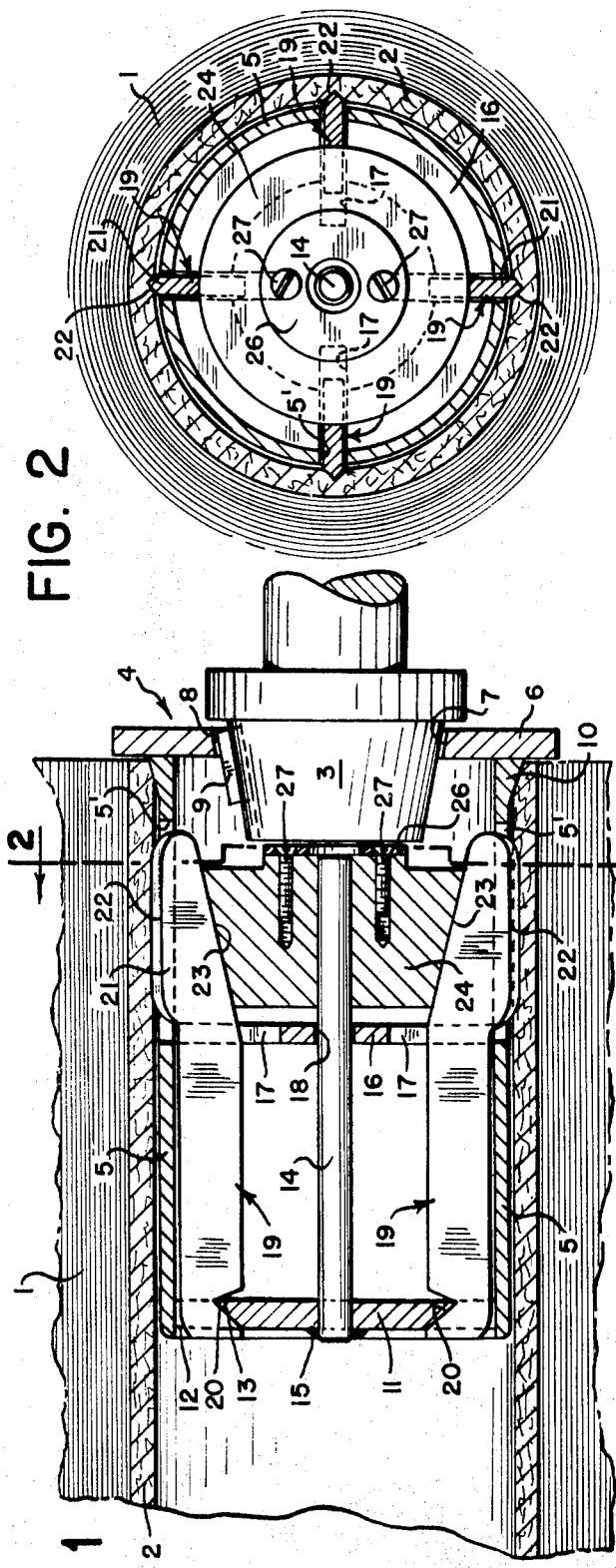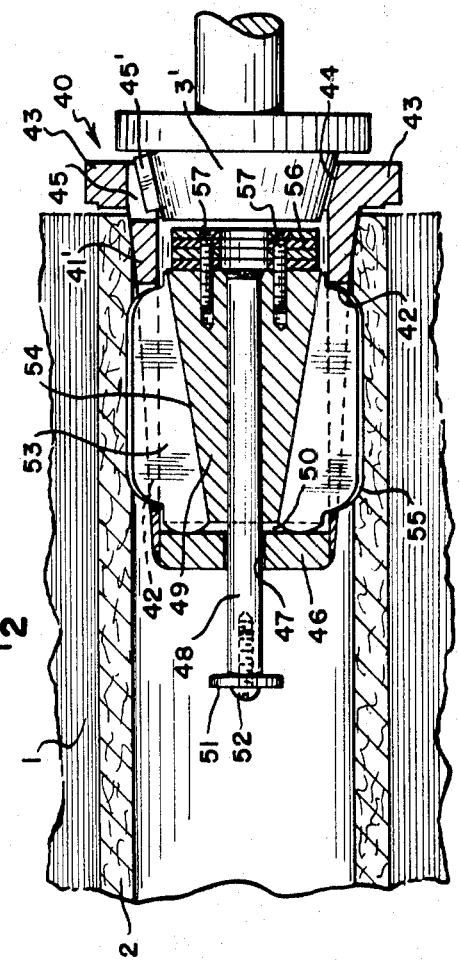
INVENTOR
Albion J. Thompson

//3,610,643

CHUCK ADAPTER

BACKGROUND OF THE INVENTION

In the past, it has been customary in the printing industry to provide a 3-inch-tapered chuck on splicing apparatus used to splice a fresh web of paper onto an expiring web which running running into a printing press. Accordingly, webs of paper have been usually wound on heavy cores having an inside diameter which conforms to the size of the tapered chuck with the core being notched at one end in order to receive a key carried by the chuck whereby the core was prevented from rotation relative to the chuck. In the event that the core was made of paper, metal caps were used on the end of the core to provide reinforcement.

A positive interlock between the chuck and the paper roll is essential since the chuck of the splicing apparatus is often used as a point of reference for timing the splice and therefore it must be fixed securely to the paper roll in order to prevent slippage between the heavy paper roll and the chuck. Braking forces are also often imparted to the chuck or to the periphery of the roll in order that proper tension may be maintained on the web during its passage through the press thus further requiring a positive interlock between the chuck and core to prevent slippage.

In recent times, it has become increasingly apparent that significant economy can be achieved by using larger rolls of paper. These larger rolls having correspondingly been provided with larger cores, the most common of which is a core having an inside diameter of 5 inches, in order to improve the winding of the web on the core. In turn, the utilization of larger paper rolls has presented severe problems due to the fact that current presses are fitted with chucks constructed for use only with the smaller diameter core, usually a standard 3-inch core. The most basic and obvious problem is the fact that the existing chuck, having a diameter smaller than the core of the new paper rolls, is incapable of fitting properly into he core of a larger roll.

A further problem existing in the field with the 3-inch-tapered chucks when used with conventional 3-inch cores is that the length of the chucks and their degree of taper will often vary from chuck to chuck. This results in uncertain or inaccurate locking engagement between the chuck and core.

A further problem exists in that the metal caps used on paper cores of all sizes including the standard 3-inch core are relatively expensive. Such caps are not considered expendable but rather are returned to the paper mill for reuse.

These problems of varying core sizes and varying chuck dimensions can be overcome in a number of ways. First, all the existing chucks could be altered or replaced with chucks which would accommodate the large diameter cores and which would be of a standard dimension. However, this course is not entirely practical as part of a press run may utilize rolls of paper having both the large 5-inch core or the smaller 3-inch core. Moreover, a great many splicing mechanisms are presently provided with 3-inch chucks, which, because of the sheer numbers involved, would entail a considerable capital expense to modify to larger size chucks. Second, all the existing 3-inch chucks could be standardized to ensure their having the same length and degree of taper but this would require replacement of many chucks in the field and still would not provide the structure necessary to accommodate the larger size core construction.

An alternate approach is to construct a device totally independent of the chuck itself which will allow the larger paper rolls having the 5-inch cores and the conventional paper rolls having the 3-inch cores to be used with existing 3-inch chucks and to eliminate the need of any separate metal end cap on the paper cores. It is to such a device that the subject matter of the invention is directed.

SUMMARY OF THE INVENTION

The subject matter of this invention is directed to a chuck adapter insertable into the core of a roll of paper or other sheet material and which is constructed to receive a chuck having a diameter less than or substantially equal to the inside diameter of the core in the paper roll and in such fashion as to unite the paper roll and chuck together in interlocking arrangement by means of cooperating action between the chuck and the chuck adapter.

The chuck adapter comprises generally a cylindrical shell having a flanged mouth and a plurality of longitudinal openings in the surface thereof. A plurality of radially movable gripping bars are pivotally or slidably mounted within the shell and have cam surfaces thereon. An axially movable member having tapered surfaces thereon is slidably mounted in the shell and the tapered surfaces are adapted to engage the cam surfaces of the bars to move the bars radially outward of the shell upon engagement of an axial end of the axially movable member with the end of a chuck.

Each bar carries a protruding blade portion having a bevelled edge in order that the bar may cut into the core, which is usually made of paper, when forced out of the shell by the axially movable member. This will ensure a positive interlock between the chuck adapter and core. The chuck adapter is locked against rotation relative to the chuck by means of a key on the chuck engaging a keyway in the flanged mouth of the shell.

In one form of the invention, the bars are pivoted about an end member carried in the end of the chuck adapter and the other ends of the bars are slidable within a spider carried within the shell. A longitudinally extending shaft is positioned axially in the shell and serves as a guide for an axially movable cone member. In this form of the invention, as the axially movable cone member contacts the end of a chuck, it moves into engagement with the cam surface of the bars whereby the bars are pivoted about their pivot points to protrude through the shell member as their cam surfaces slide up the tapered surface of the axially movable cone member.

In another form of the invention, the bars slide on inclined grooves forming tapered surfaces in an axially movable cylinder member. In this form of the invention, the cylinder member carries an axially extending shaft which is slidable within a guide fixed onto the end of the chuck adapter. This embodiment of the invention in operation acts similarly to the first embodiment in that as the end of the chuck is brought into contact with the end of the cylinder member, the cylinder member is caused to slide with respect to the cam surfaces of the bars thus forcing the bars to slide in the inclined grooves and to protrude from the shell whereby their blade portions will cut into the paper core.

In both forms of the invention, adjustment means may be provided in the end of the axially movable member to accommodate chucks of varying lengths.

DESCRIPTION OF THE DRAWINGS

FIG. 1 is a cross-sectional elevation view of a chuck adapter constructed according to the invention for use with a core of relatively large diameter as compared with the diameter of the chuck;

FIG. 2 is a cross-sectional view of FIG. 1 taken along lines 2—2; and

FIG. 3 is a cross-sectional view of a different form of chuck adapter used for locking cores to a chuck of substantially the same diameter as the core but where the chuck may have variations in length and taper.

DETAILED DESCRIPTION OF THE INVENTION

Referring to FIG. 1, there is illustrated a large roll 1 of paper or other material having therein a paper core 2 which is to be locked to a chuck 3 of a roll-using apparatus, for example a printing press, by means of a chuck adapter denoted generally 4. The chuck adapter as shown comprises a cylindrical shell member 5 having a plurality of longitudinally extending slots 5' on its outer periphery and a flange 6 on the outer end thereof. The flange 6 has a bore 7 which aligns the chuck and the adapter and limits the travel of the chuck into the adapter. The flange is provided with a keyway 8 which slidably engages a key 9 on the chuck in order to provide a positive lock against relative rotation between the shell 5 and the chuck 3.

The shell 5 is also provided with a built-up portion 10 located on its outer surface immediately adjacent the flange 6 which portion serves to maintain a relatively tight press fit between the shell and the core 2 thus further increasing the press fit between the shell and the core and aligning the adapter.

A circular end member 11 is positioned in one end of the shell and has slots 12 cut in the outer periphery thereof with the bottom of the slot cut on an angle in order to form crests 13. A shaft 14 extends through the end member 11 and is fixed thereto by welds 15 or by other means.

A radially extending spider 16 is positioned approximately midway within the shell 5 and has radially extending slots 17 cut therein as shown in FIGS. 1 and 2. The spider also has a bore 18 through which the shaft 14 extends.

Bars 19 are mounted within the shell and within the slots 12 of the end member 11 and slots 17 of the spider 16. Each bar has a notch 20 cut into one end thereof which will cooperate with a crest 13 to form a pivot point about which the bar may pivot. Each bar is provided with a blade portion 21 having a bevelled cutting edge 22 which enables the blade portion to cut into and become embedded in the paper core as shown in FIG. 2 when forced radially outwardly of the shell. Each bar also has a cam surface 23, the purpose of which is more fully explained hereafter.

An axially movable cone-shaped member 24 is mounted for sliding movement on shaft 14 such that the tapered surfaces of the cone member may engage the cam surfaces of the bars as the cone member is moved towards the bars. The cone member has adjustment shims 26 mounted at an axial end thereof by means of screws 27 to accommodate chucks of varying length and which serve as a chuck-engaging face for the cone member.

When it is desired to mount a roll as shown in FIG. 1 onto a chuck, the chuck is initially inserted into the bore 7 of the flange and with the key 9 within the keyway 8 of the flange. Further movement of the chuck into the chuck adapter causes the cone-shaped member to move to the left as shown in FIG. 1 whereby the tapered surface of the cone-shaped member will engage the cam surfaces of the bars causing the bars to rotate about their pivot points. As the levers rotate about their fulcrum points, the blade portions 21 will extend through the slots 5' contained in the outer periphery of the shell 5 to cut into the paper core of the paper roll thereby providing a positive lock against relative rotation between the shell and paper core.

In the event that the adapter is to be used with chucks having a shorter length than normal, additional adjustment shims 26 may be added onto the cone member to insure proper amount of movement of the cone member to cause outward movement of the levers. Thus the chuck adapter is readily adaptable for use with chucks of varying lengths.

The chuck adapter as shown in FIG. 1 provides a structure by which existing chucks may be used with cores of larger diameter than the chuck. Thus the construction provides a means of positively locking paper rolls to chucks wherein the dimensions of the chucks differ from that of the core of the roll and where the use of relatively expensive metal end caps may be eliminated.

The chuck adapter shown in FIG. 3 provides a construction whereby a positive interlock is assured between paper rolls having cores of approximately the same diameter as the chuck to which they are to be mounted but where the chucks may have varying lengths and degrees of taper. As shown in that figure, the chuck adapter 40 comprises a shell member 41' having a plurality of slots 42 in the outer periphery thereof and a flange 43 one one end thereof. The flange 43 has a bore 44 for receiving the end of the chuck 3' and also has a keyway 45 for receiving the key 45' of the chuck whereby relative rotation between the shell 41 and the chuck 3 is prevented.

A closure member 46 is fixed at the opposite end of the shell and has a bore 47 therein through which a shaft 48 may slide. The shaft 48 has an axially movable cylinder member 49 having a plurality of inclined grooves 50 fixed thereon at one end and has a stop 51 fixed at the other end by means of a screw 52. The structure thus differs from the embodiment of FIG. 1 in that the cylinder member and shaft slide with respect to the member 46 whereas in the embodiment of FIG. 1, the cone member slides with respect to the shaft 14. In both instances, however, the shaft serves as an axial guide means for the axially movable member.

Bars 53 are provided in each of the slots 42 wherein the bars have cam surfaces 54 for engaging the surfaces of the inclined grooved cylinder member 49. Each bar is provided with a blade portion 55 similar in construction to that shown in FIG. 1 in order that the bar may cut into the wall of a paper core to provide the locking force between the core and the shell. Adjustment shims 56 are mounted on the end of the cylinder member by screws 57 in the same manner as in FIG. 1 to accommodate chucks of varying lengths.

The operation of the chuck adapter shown in FIG. 3 is generally similar to that shown in FIG. 1. As the chuck 3' is inserted into the bore 44, it will contact the adjustment shims 56 on the end of the cylinder member 49 forcing the member to the left as shown in FIG. 3. The shim adjacent the chuck serves as a chuck-engaging face for the member 49. The inclined grooves of the cylinder member will engage the cam surfaces 54 of the bars thus forcing the bars to move radially outwardly of the shell until the blade portions 55 of the bars imbed into the paper core to lock the core against rotation relative to the shell.

It is seen that the degree of taper on the chuck has no effect on the engagement of the chuck adapter with the core as in the embodiment shown in FIG. 1. Thus the chuck adapter shown in FIG. 3 may be used with a variety of chucks having varying degrees of taper as well as varying lengths.

I claim:

1. A chuck adapter for locking a hollow tube onto a chuck comprising:
   a. a cylindrical shell having a flanged mouth at one axial end thereof for receiving and surrounding a chuck and at least one longitudinally extending opening disposed in the outer surface thereof;
   b. a bar having a cam surface thereon located in aligned relationship with each said opening with a portion of said bar adapted to move radially outwardly through said opening to grip the inner surface of a hollow tube;
   c. means for mounting each said bar to move in a radial direction with respect to said shell; and
   d. an axially movable member having an inclined surface thereon within said shell adapted to engage the cam surface of each said bar along its inclined surface and having a chuck-engaging face on an axial end thereof adjacent the flanged mouth of said shell adapted to engage a chuck along an axial end thereof; whereby movement of a chuck into engagement with said chuck-engaging face will cause the axially movable member to move axially with respect to said shell until the inclined surface thereof engages a cam surface to cause a bar to move radially outwardly of said shell to lock with the interior of a hollow tube.

2. A chuck adapter according to claim 1 further comprising a support member fixed at one end of said shell and having a radially extending slot therein for each bar with the inner edge of the slot serving as a pivot means about which said bar may pivot to move in a radial direction with respect to said shell.

3. A chuck adapter according to claim 2 wherein said axially movable member is cone-shaped and further comprising an axially extending shaft coaxial with said shell and fixed to said support member and a coaxial bore in the axially movable cone-shaped member through which said shaft extends whereby said shaft serves as a longitudinal guide for said axially movable cone-shaped member.

4. A chuck adapter according to claim 3 further comprising a radially extending spider fixed internally to said shell, said spider having a radially extending slot for slidably receiving a bar with said slot extending inwardly from the outer periphery of said spider a distance less than the radius of said spider.

5. A chuck adapter according to claim 1 having in addition a closure member fixed to the end of said shell opposite the flanged mouth with a coaxial bore therein and a coaxially extending shaft fixed to said axially movable member and slidably extending through the bore of said closure member whereby said shaft serves as a guide member for said axially movable member.